United States Patent
Carlie

(10) Patent No.: US 10,191,186 B2
(45) Date of Patent: Jan. 29, 2019

(54) OPTICAL BONDING THROUGH THE USE OF LOW-SOFTENING POINT OPTICAL GLASS FOR IR OPTICAL APPLICATIONS AND PRODUCTS FORMED

(71) Applicant: SCHOTT CORPORATION, Elmsford, NY (US)

(72) Inventor: Nathan Aaron Carlie, Waverly, PA (US)

(73) Assignee: SCHOTT CORPORATION, Elmsford, NY (US)

( * ) Notice: Subject to any disclaimer, the term of this patent is extended or adjusted under 35 U.S.C. 154(b) by 1054 days.

(21) Appl. No.: 14/210,578

(22) Filed: Mar. 14, 2014

(65) Prior Publication Data

US 2016/0377766 A1    Dec. 29, 2016

Related U.S. Application Data

(60) Provisional application No. 61/790,358, filed on Mar. 15, 2013.

(51) Int. Cl.

| | |
|---|---|
| *B32B 37/04* | (2006.01) |
| *B32B 17/06* | (2006.01) |
| *G02B 1/10* | (2015.01) |
| *C03C 3/14* | (2006.01) |
| *C03C 3/21* | (2006.01) |
| *C03C 3/23* | (2006.01) |
| *C03C 3/32* | (2006.01) |
| *C03C 4/10* | (2006.01) |
| *C03C 8/24* | (2006.01) |
| *C03C 8/02* | (2006.01) |

(52) U.S. Cl.
CPC ............... *G02B 1/10* (2013.01); *B32B 17/06* (2013.01); *B32B 37/04* (2013.01); *C03C 3/14* (2013.01); *C03C 3/21* (2013.01); *C03C 3/23* (2013.01); *C03C 3/321* (2013.01); *C03C 4/10* (2013.01); *C03C 8/02* (2013.01); *C03C 8/24* (2013.01); *B32B 2307/40* (2013.01); *C03C 2204/00* (2013.01); *C03C 2207/00* (2013.01)

(58) Field of Classification Search
None
See application file for complete search history.

(56) References Cited

U.S. PATENT DOCUMENTS

| | | |
|---|---|---|
| 2,883,292 A | 4/1959 | Jerger, Jr. |
| 2,883,293 A | 4/1959 | Jerger, Jr. |
| 2,883,294 A | 4/1959 | Jerger, Jr. |
| 2,961,350 A | 11/1960 | Flaschen et al. |
| 3,024,119 A | 3/1962 | Flaschen et al. |
| 3,033,693 A | 5/1962 | Carnall, Jr. |
| 3,121,208 A | 2/1964 | Karlson |
| 3,157,521 A | 11/1964 | Cary et al. |
| 3,241,986 A | 3/1966 | Jerger, Jr. |
| 3,312,548 A | 4/1967 | Straughan |
| 3,312,924 A | 4/1967 | Eubank et al. |
| 3,413,187 A | 11/1968 | Krause et al. |
| 3,428,475 A | 2/1969 | Teeg |
| 3,524,745 A | 8/1970 | Cerlon |
| 3,655,255 A | 4/1972 | Krause |
| 3,901,996 A | 8/1975 | Hasegawa |
| 3,983,076 A | 9/1976 | Rockstad |
| 4,072,758 A | 2/1978 | Marin Moga |
| 4,072,782 A | 2/1978 | Kramer |
| 4,154,503 A | 5/1979 | Lettington |
| 4,492,763 A | 1/1985 | Trotta |
| 4,557,914 A | 12/1985 | Modone |
| 4,658,087 A | 4/1987 | Fong |
| 4,704,371 A | 11/1987 | Krolla |
| 4,920,081 A | 4/1990 | Beall |
| 4,929,065 A * | 5/1990 | Hagerty ............... G02B 3/0087 359/653 |
| 5,122,484 A | 6/1992 | Beall |
| 5,281,560 A | 1/1994 | Francis |
| 5,352,639 A | 10/1994 | Lucas |
| 5,366,936 A | 11/1994 | Vlasov |
| 5,389,584 A | 2/1995 | Aitken |
| 5,392,376 A | 2/1995 | Aitken |
| 5,441,803 A * | 8/1995 | Meissner ............... B32B 17/00 156/60 |
| 6,128,429 A | 10/2000 | Cole |
| 7,143,609 B2 | 12/2006 | Aitken |
| 7,330,634 B2 | 2/2008 | Aitken |
| 7,502,123 B2 | 3/2009 | Schmidt |
| 7,547,652 B2 | 6/2009 | Zhang et al. |
| 7,767,604 B2 | 8/2010 | Aitken |
| 9,379,321 B1 | 6/2016 | Chang |
| 2004/0172975 A1 | 9/2004 | Hirota et al. |
| 2006/0257097 A1* | 11/2006 | Aitken ..................... C03C 3/321 385/147 |
| 2010/0064731 A1* | 3/2010 | Nguyen ............ C03B 37/01265 65/434 |
| 2012/0094084 A1* | 4/2012 | Fisher ............... B32B 17/10036 428/174 |
| 2012/0154918 A1 | 6/2012 | Murayama et al. |
| 2012/0328843 A1* | 12/2012 | Cleary .............. B32B 17/10036 428/174 |
| 2013/0111953 A1* | 5/2013 | Maloney ................. H01L 21/50 65/43 |
| 2013/0278999 A1 | 10/2013 | Carlie |
| 2015/0038314 A1 | 2/2015 | Aitken |

FOREIGN PATENT DOCUMENTS

| | | |
|---|---|---|
| CN | 87207006 U | 7/1988 |
| CN | 1553880 A | 12/2004 |

(Continued)

OTHER PUBLICATIONS

Refractive index of ZnSe (Zinc selenide), <https://refractiveindex.info/?shelf=main&book=ZnSe&page=Marple>, pp. 1-2, accessed from the world wide web on Mar. 30, 2018.*

(Continued)

*Primary Examiner* — Derek S. Chapel
(74) *Attorney, Agent, or Firm* — Millen White Zelano and Branigan, PC; Csaba Henter

(57) ABSTRACT

The invention relates to infrared devices, which contain at least two optical elements that are bonded together by a low-temperature melting glass which possesses transparency in the infrared spectrum, and methods of preparation and use of said infrared devices.

23 Claims, No Drawings

(56) References Cited

FOREIGN PATENT DOCUMENTS

| | | |
|---|---|---|
| CN | 1708460 A | 12/2005 |
| CN | 1736919 A | 2/2006 |
| CN | 101007705 A | 8/2007 |
| DE | 3322494 A1 | 1/1985 |
| FR | 2574567 A1 | 6/1986 |
| GB | 1008586 A | 10/1965 |
| GB | 1136593 A | 12/1968 |
| GB | 1413702 A | 11/1975 |
| GB | 1419401 A | 12/1975 |
| JP | 63054659 A | 3/1988 |
| JP | 63155441 A | 6/1988 |
| JP | 63218518 A | 9/1988 |
| JP | 63225555 A | 9/1988 |
| JP | 1100036 A | 4/1989 |
| JP | 1100037 A | 4/1989 |
| JP | 1138158 A | 5/1989 |
| JP | 2124738 A | 5/1990 |
| JP | 3012339 A | 1/1991 |
| JP | 3080131 A | 4/1991 |
| JP | 3237401 A | 10/1991 |
| JP | 3285837 A | 12/1991 |
| JP | 4046033 A | 2/1992 |
| JP | H769672 A | 3/1995 |
| JP | 7239489 A | 9/1995 |
| JP | 9110461 A | 4/1997 |
| JP | 2005506264 A | 3/2005 |
| JP | 2008105869 A | 5/2008 |
| JP | 2008191148 A | 8/2008 |
| JP | 2012148975 A | 8/2012 |
| JP | 2016150887 A | 8/2016 |
| SU | 140544 A1 | 11/1960 |
| SU | 267791 A | 2/1970 |
| SU | 1051490 A1 | 10/1983 |
| WO | 9923517 A1 | 5/1999 |
| WO | 2003029856 A2 | 4/2003 |
| WO | 2004/092080 A1 | 10/2004 |

OTHER PUBLICATIONS

Refractive index of ZnS (Zinc sulfide), <https://refractiveindex.info/?shelf=main&book=ZnS&page=Debenham>, pp. 1-2, accessed from the world wide web on Mar. 30, 2018.*
Chinese Office Action dated Feb. 4, 2017 issued in corresponding CN 201410172756.4 application (6 pages).
English Translation of Chinese Office Action dated Feb. 4, 2017 issued in corresponding CN 201410172756.4 application (7 pages).
English Abstract of CN 87207006 U published Jul. 20, 1988.
English Abstract of CN 1553880 A published Dec. 8, 2004.
E. Bormashenko et al., "Development of the Technology of Contacting ZnSe Infrared Optical Windows Using Polyethylene Films", Optical Engineering, vol. 40 No. 9 (Sep. 2001) pp. 1754-1755.
V.F. Kokorina, "Glasses for Infrared Optics", CRC Press, Technology & Engineering (May 1996) pp. 142-147.
Y. Mel'nikova et al., "A Thermoplastic Cement Transmitting in the IR", Optical Technology, vol. 40 No. 3 (Mar. 1973) pp. 206-207.
S.F. Pellicori et al., "Optical Bonding Agents for IR and UV Refracting Elements", SPIE, Passive Materials for Optical Elements, vol. 1535 (1991) pp. 48-54.
J. Li et al., "Optical Brazing Technique for Bonding Diamond Films to Zinc Sulfide", Diamond and Related Materials, vol. 11 (2002) pp. 753-756.
S.M. Song et al., "Chalcogenide Glasses for Optical Brazing", Journal of Materials Science, vol. 33 (1998) pp. 5397-5400.
English Machine Translation of FR2574567 dated Jun. 13, 1986.
Kramer et al. (ed), Westinghouse handbook: Development of Multispectral Sandwich-Type IR Windows; Apr. 1977; pp. iii-ix, 1-84.
Hilton A.R.; Optical Properties of Chalcogenide glasses; Journal of Non-Crystalline Solids 2 (1970) 28-39.
Aio L.G, Refractive Index of Chalcogenide glasses Journal of Non-Crystalline Solids 27 (1978) 299-307.
English Machine Translation of JP63054659 dated Mar. 9, 1988.
English Machine Translation of DE3322494 dated Jan. 10, 1985.
English Machine Translation of JP1051490 dated Oct. 30, 1983.
English Machine Translation of JP63225555 dated Sep. 20, 1988.
English Machine Translation of JP63218518 dated Sep. 12, 1988.
English Machine Translation of JP9110461 dated Apr. 28, 1997.
English Machine Translation of JP7239489 dated Sep. 12, 1995.
English Machine Translation of JP1138158 dated May 31, 1989.
English Machine Translation of JP1100037 dated Apr. 18, 1989.
English Machine Translation of JP1100036 dated Apr. 18, 1989.
English Machine Translation of JP63155441 dated Jun. 28, 1988.
English Machine Translation of JP3080131 dated Apr. 4, 1991.
English Machine Translation of JP4046033 dated Feb. 17, 1992.
English Machine Translation of JP2124738 dated May 14, 1990.
English Machine Translation of JP 2016150887 dated Aug. 22, 2016.
English Machine Translation of JP 3012339 dated Jan. 21, 1991.
English Machine Translation of JP 101007705 dated Aug. 1, 2007.
English Machine Translation of JP 1736919 dated Feb. 22, 2006.
English Machine Translation of JP 3237401 dated Oct. 23, 1991.
English Machine Translation of JP 3285837 dated Dec. 17, 1991.
GAN Fuxi, New Glass-Forming and Their Practical Application, Journal of Non-Crystalline Solids, Aug. 2, 1990, vol. 123, Issues 1-3, pp. 385-399.
GAN Fuxi, Structure, properties and applications of chalcohalide glasses: a review, Journal of Non-Crystalline Solids, 1992, vol. 140, pp. 184-193.
Xiang Shen et al., Preparation and third order optical nonlinearity of glass ceramics based on GeS2—Ga2S3—CsCl pseudo-ternary system, Journal of Non-Crystalline Solids, Feb. 25, 2011, vol. 357, pp. 2316-2319.
Jing Ren et al., Intense near-infrared and midinfrared luminescence from the Dy3+-doped GeSe2—Ga2Se3—MI (M=K, Cs, Ag) chalcohalide glasses at 1.32, 1.73 and 2.67 μm, Journal of Applied Physics, Feb. 4, 2011, vol. 109, p. 033105.
Office Action in corresponding Japanese Patent Application No. 2014-051697 dated Jan. 5, 2018.
Office Action in corresponding China application 201410172756.4 dated Nov. 23, 2017.
Functional Glasses ; Edited by Qijia Li, Chemical Industry Press; p. 175.
Office Action in corresponding CN Application No. 2014-10172756.4 dated Nov. 9, 2018 with supplemental search report. (pp. 1-8).
Office Action in corresponding CN Application No. 2014-10172756.4 dated Nov. 9, 2018 with supplemental search report—English translation (pp. 1-16).

* cited by examiner

OPTICAL BONDING THROUGH THE USE OF LOW-SOFTENING POINT OPTICAL GLASS FOR IR OPTICAL APPLICATIONS AND PRODUCTS FORMED

The invention relates to infrared devices, preferably infrared optical devices, instruments or systems, which transmit light in the near-, mid- and/or far-range infrared spectrum, and optionally also within at least a portion of the visible spectrum. In particular, the invention relates to such devices wherein at least two optical elements are bonded or glued together by a low-temperature melting glass which possesses transparency in said infrared spectrum(s) and optionally a portion of the visible spectrum. The bonding glass preferably has a refractive index close to the refractive index of at least one of the optical elements to be bonded or has a refractive index that is between the refractive indices of the optical elements. The invention furthermore relates to methods of preparation of said infrared devices, particularly methods of bonding or gluing together of two or more infrared optical elements, and methods of use of infrared devices containing such two or more optical elements are bonded or glued together.

This invention includes the use of several low-temperature melting glasses as bonding glasses, which possess transparency in various ranges of interest, i.e., in near-infrared range (e.g., 700 nm to 1.8 µm), the mid- infrared range (e.g., 3.0-5.0 µm) and/or the far-infrared range (e.g., 8.0-13.0 µm), and have a variety of refractive indices, preferably in the range of 1.4 to 6.0, more preferably, in the range of 1.5 to 4.0, e.g., 2.0, 2.5, 3.0, 3.5, and 4.0.

Said bonding glasses serve as a bonding layer between two optical surfaces in devices which include doublet lenses, triplet lenses, beam splitter cubes, di- and tri-chroic mirrors, spectral filters, image erecting (Porro-Abbe and Schmidt-Pechan) prisms, Wollaston and Glan-Taylor polarizers, spectroscopic devices such as the amici prism, and others. These devices find use in optical systems such as binoculars, telescopes, targeting scopes, and scientific instruments. Preferably, the products and devices are capable of operating in the IR wavelengths. Of particular interest are multiplet lenses, beam splitters, di- and tri-chroic mirrors, polarizers, and image erecting prisms, as all of which find use in imaging systems or other infrared instruments.

The invention allows the proliferation of the wide variety of bonded optical devices which have been contrived for the visible spectrum into a new range of infrared devices, i.e., any optical device having multiple optical elements that are bonded together or otherwise operate in conjunction with each other can be transformed into an infrared device by the selection of optical elements having transmission in an IR range, which are bonded together by a bonding glass according to the invention.

Currently, there are many devices which require the use of optical bonding technologies for their construction. These include doublet and triplet lenses, beam splitter cubes, di- and tri-chroic mirrors, spectral filters, image erecting (Porro-Abbe and Schmidt-Pechan) prisms, Wollaston and Glan-Taylor polarizers, spectroscopic devices such as the amici prism, and others. Said devices are assembled using optically transparent adhesives such as epoxies and silicones when they are used in the visible and UV portions of the electromagnetic spectrum. However, in the infrared portion of the spectrum, the absorption of light by the organic chemicals in these materials prevents them from being transparent. As a result, many of these devices cannot be constructed for the IR spectral range.

Previous attempts to correct this problem include using carefully chosen polymers as the bonding agent, such as polyethylene (which has the lowest IR absorption of any thermopolymer). However, these attempts have all resulted in poor transparency. This is partly due to the infrared absorption of the material, partly due to the tendency of this material to crystallize, which causes optical scattering, and partly due to the mismatch of the material's refractive index (~1.5) with that of the optic to be bonded (typically 2-4), which causes strong reflection at the interfaces.

An important consideration for bonding together optical elements with glasses is the index matching of the bonding glass to that of the optical elements to be bonded to minimize reflection at the interfaces. Generally, there are two routes for index matching or tuning the index of the bonding glass to the elements to be bonded to provide low reflection at the interfaces.

The first option is to select a refractive index for the bonding glass that is between the refractive indices of the materials to be bonded, preferably by tuning the index to the geometric average index of the two materials being bonded. This has the advantage of eliminating the need for coatings in most applications, which is a typical way to adjust the reflectivity at the interface between different materials. The elimination of such a coating at one of materials or both is advantageous in that costs are reduced as well as bonding strength is possibly enhanced when no coating is present on the optical elements to be bonded.

For example, a low index glass with refractive index (n) of 1.5 would have a reflection of 4% and a high index glass with n of 2.5 would have a reflection of 18% due to the air space between them as calculated from Fresnel's equation, which is simplified for normal incidence of light, i.e., reflection=$[(n_1-n_2)/(n_1+n_2)]^2$, where for air n=1. Of course, the well-known more expanded formula taking into account the incidence of light at an angle may be also used when such information is known for a particular device or optical system. For typical applications, such high reflections as in the scenario above are unacceptable and the use of at least one coating would be required to reduce reflection. However, if these elements are bonded with glass having a refractive index equal to the geometrical average of the two, n=$(1.5\times2.5)^{1/2}$ the reflections at both interfaces would drop to only 1.6% each and no coating would be needed for typical applications.

However, there is a disadvantage of the choice above, which is that a thin bond layer can cause optical interference between the two interfaces. This could become a problem in certain cases, for example, with Ge (n=4.0) bonded to $CaF_2$ (n=1.45) which would give 6% reflection per surface. Such an approach may give possible ghost images or variation of transmission with wavelength.

A further approach is to provide interference patterns to create anti-reflection coatings, and to reduce reflections even further at important wavelengths, but would require careful control of thickness and uniformity of bond layer. These considerations are well known and one skilled in the art can design the appropriate approach in a given situation.

An alternate option is to tune the refractive index of the bonding glass to closely match one of the two materials to be bonded, e.g., within 10%, more preferably within 5% or less, preferably still having a value equal to or between the indices of the two optical elements to be bonded. Such an approach has the advantage of removing one reflection entirely or nearly entirely, and allows for a wide variation in bond layer thickness, from a few to many hundreds of micrometers, as no interference effects will occur. However, due to the now higher total reflectivity at the other remaining interface, coating of the second material will likely be needed. The coating generally will have to be designed specifically for the bonding glass. However, providing the coating in this situation will likely be much easier than providing a coating for anti-reflection against air since the index mismatch between the bonding glass and the second optical element will likely be much smaller, and as such, more design choices are available.

For example, two materials, one having n=1.5 and the other having n=2.5, with a bonding glass layer having n=1.5 would give only one 6% reflection, which is not as advantageous as the two 1.6% reflections discussed above. In this case, a coating may be used, for coating the n=2.5 glass for anti-reflection against n=1.5, which is easier than providing an anti-reflection coating against air, which has n=1.0.

An alternate approach for the example above is to use n=2.5 bonding glass material, and then provide a coating for the n=1.5 glass for anti-reflection. The resultant product would yield similar results, but would have a different coating design, and there may be some possible differences in adhesion-promotion layers.

The primary adhesion promotion layers include $GeO_2$, MgO, ZnO and similar oxides which provide very strong covalent bonds and have some degree of IR transparency. These must be very thin not to exhibit problematic absorption in the LWIR (generally only a few tens of nm). Said adhesion promotion layers are typically applied by a sputtering technique when any type of coating is desired. These are not necessary in order to bond, for example, chalcogenide or oxide glasses, but may be more preferred for fluoride materials such as $BaF_2$.

In one alternate aspect, a polymer-glass combination may be effectively applied as adhesion promoter layers or in an alternate embodiment used as the bonding glass per se. For example, a chalcogenide-polymer hybrid film may be fabricated with widely tunable index. However, different glasses disclosed herein may also be similarly utilized. Such an embodiment comprises, for example, a polymer and bonding glass, e.g., chalcogenide glass, which are dissolved in the same solvent and then form a coating by spin-casting or dip-coating on the surface of an optical element to be bonded. Suitable solvents are basic in nature and must have a labile hydrogen atom. These include primary and secondary amines, with the most effective having been found to be hydrazine—which may be replaced by ethanolamine, ethylenediamine or diethylamine (or similar) as a less-toxic substitute. When such a solution is directly coated onto a substrate and heat treated near the Tg of the dissolved glass, an amorphous chalcogenide film is created. Noted is that oxygen typically must be carefully excluded by performing all steps under inert atmosphere. Alternately, a polymer may then also be dispersed into said solution and a coating formed as above. The resultant film will be a nanocomposite and would have properties intermediate between the two of the glass and the polymer. As the polymer must also be soluble in the solvent used for the glass, they typically must be quite polar. These include PEO, PEG, poly-amines and similar. One of skill in the art can readily choose from among a large number of possibilities known in the art. Alternately, and preferably, the solvent may be extracted by simple evaporation or by lyophilization and the resulting material can be re-dissolved into a solvent which is non-basic, but polar including: alcohols, some ketones, amides, DMSO, acrylonitrile, halogenated solvents such as dichloromethane and similar. To such a solution, a much broader list of possible polymer materials may be added excluding only polyolefins, polyamides (such as kevlar and similar) and perfluorinated polymers such as PTFE. For example, a solution of $As_2S_3$ and polyvinylidenedifluoride (PVDF) using dimethylformamide (DMF) as the solvent may be obtained in this way. Said materials can be used as adhesion promoter layers due to high IR transparency or as the bonding material per se between two IR optical elements, and provide the possibility of processing forms which are piezo-electric, have high optical nonlinearity or other related functionalities. Similarly, a hybrid of polyaniline will be highly conductive, and may be prepared in this same fashion. Also noted is that these polymers should all present relatively low softening points and be suitable for bonding if combined with a bonding glass, for example, a low-Tg chalcogenide. These embodiments have the advantage that they all offer a very broad range of index tuning (e.g., 1.45 to 2.8), but will have a reduced IR transmission due to the presence of organics.

The bonding process can be the same for all types of materials. The melting point of the bonding glass has to be low enough so as to not damage, e.g., deform, the optical elements to be bonded, or otherwise damage the coating and adhesion-promotion layers thereon, when the bonding glass is applied in a molten state. Preferably, the bonding glasses have a melting point that is at least 20° C. lower, more preferably at least 50° C. lower, and even more preferably at least 100° C. lower, than the glass transition temperature or melting point of the optical elements to be bonded.

Generally, the bonding glasses have a melting point preferably below 400° C., preferably in the range of 100 to 200° C., and more preferably in the range of 60 to 150° C.

The glass transition temperature of the bonding glass, i.e., $T_g$, should be significantly lower than of the materials to be bonded so as not to deform to materials during the bonding process. Preferably, the bonding glasses have a $T_g$ that is at least 20° C. lower, more preferably at least 50° C. lower, and even more preferably at least 100° C. lower, than the $T_g$ of the optical elements to be bonded.

Thermal expansion of the bonding glass should also be matched reasonably closely to the thermal expansion of the materials to be bonded so to minimize stresses at the interfaces with temperature changes. However, the thermal expansion in practice will likely be higher due to the need for the bonding glass to have a lower Tg.

In one aspect of the invention, the bonding processes disclosed herein are not limited to the bonding of only IR transmitting optical elements. The bonding processes, for example, are useful for bonding optical elements having transmission in other wavelengths, e.g., in the visible range. Advantages of the bonding processes disclosed herein in any transmission range include all disclosed advantages, e.g., strong bonds, possibility of elimination of coatings from one or both of the surfaces to be bonded, etc.

Preferably, the bonding glasses are selected so that they have at least as much transmission range as materials to be bonded, preferably more. For example, if the IR transmission of a device is within a given range, the bonding material preferably has an IR transmission range that at least matches that of the device, and more preferably has a broader range by about 5%, preferably 10% or even more. Typically, it is preferred that the bonding glass is not the IR transmission limiting element, although in some cases this may be acceptable.

Suitable bonding glasses include oxide glasses that generally have Tg<400° C. and expansion below 15 ppm/K with reasonable resistance to humidity. Such glasses include:

1) $R_2O$-MO—$B_2O_3$, where R=Li, Na, K, Rb, and/or Cs and M=Mg, Ca and/or Ba. The contents of $R_2O$ and MO are varied to control the coefficient of thermal expansion (CTE). These glasses are widely known in the literature. Their refractive indices are within the range of about 1.5-1.6, and their wavelength range of transmission is 0.35-2 µm.

2) 2) $R_2O$—$Al_2O_3$—$CuO_2$—$P_2O_5$, which is outlined in U.S. Pat. No. 4,920,081. R=Li, Na, Rb, or Cs. Their refractive indices are within the range of about 1.5-1.7, and their wavelength range of transmission is 0.35-2 µm.

3) $R_2O$—$Al_2O_3$—XO-$TO_3$—$P_2O_5$, where X=Zn or Sn, T=W or Mo and R also now includes Ag and Tl. R=Li, Na, Rb, or Cs. These glasses are outlined in U.S. Pat. Nos. 5,122,484, and 5,256,604.

Their refractive indices are within the range of about 1.5-1.7, and their wavelength range of transmission is 0.35-2 µm.

4) $R_2O$—ZnO—$TeO_2$, where R=Li, Na, K, Rb, or Cs. These glasses are well-known from the literature. Their refractive indices are within the range of about 1.5-1.7, and their wavelengths of transmission is 0.45-6 µm.

Other suitable bonding glass are chalcogenide glasses, which generally have a Tg<150° C. and an expansion below 50 ppm/K, with reasonable resistance to humidity. These glasses typically contain large quantity of S or Se. Such glasses include:

1) Ge—As—S—Se, where S+Se>70%; As=0-30 and Ge=0-20%. Their refractive indices are within the range of about 2.0-2.8, and their wavelength range of transmission is 0.5-14 µm.

2) Te—As—Ge—Se, where Te=30-80%, Te+Se>70% and Ge+As=10-30%. Their refractive indices are within the range of about 2.6-3.2, and their wavelength range of transmission is 1.0-16 µm. See US Patent Application Publication No. 20100064731.

Further suitable bonding glasses are halide glasses, which generally have a Tg that is very low (usually below 100° C.). But, these glasses are susceptible to attack by water and humidity. The disclosed glasses below are in order of decreasing susceptibility to water attack.

1) RCl—$AlCl_3$—$CdCl_2$—$ZnCl_2$, where $ZnCl_2$>50%, and R=Na, K, Rb or Cs. Their refractive indices are within the range of about 1.5-2.0, and their wavelength range of transmission is 0.4-10 µm. See Gan Fuxi, Journal of Non-Crystalline Solids 123 (1990) 385.

2) RX—$PbX_2$—AgX—$Bi_2X_3$, where X=Cl or Br; Pb+Ag<15%; $Bi_2X_3$>40% R=K, Rb or Cs. Their refractive indices are within the range of about 1.7-2.1, and their wavelength range of transmission is 0.4-13 µm. See Gan Fuxi, Journal of Non-Crystalline Solids 123 (1990) 385-399.

3) CsX—$PbX_2$—AgX, where X=Br or I; I>Br; PbX>60%; CsX=0-25%.Their refractive indices are within the range of about 1.9-2.3, and their wavelength range of transmission is 0.6-20 µm. See Gan Fuxi, Journal of Non-Crystalline Solids 140 (1992) 184-193.

A further option for bonding glasses include mixed glass systems. The Tg of such glasses may be varied over a wide range, e.g., 50-250° C. Their transmission is generally very broad and water attack can be low when the quantity of alkali halide is low, i.e., replacement by Ag halides. Such glasses include:

1) AgI—PbO, where PbO>60%. Their refractive indices are within the range of about 1.8-2.4, and their wavelength range of transmission is 0.5-8 µm.

2) $TeO_2$—BaO—$Na_2O$—$ZnX_2$, where X=F or Cl and $TeO_2$>60%. Their refractive indices are within the range of about 1.9-2.1, wavelength=0.4-6 µm. See Raouf A. H. El-Mallawany, Tellurite Glasses Handbook: Physical Properties and Data, Second Edition, CRC Press, Boca Raton 2011.

3) $Sb_2O_3$—$ZnCl_2$, where $ZnCl_2$<60%. Their refractive indices are within the range of about 1.5-1.8, and their wavelength range of transmission is 0.4-6 µm. See Johnson et al, *J. Phys.: Condens. Matter* 15 755; G. H. Frischat and C. T. Moynihan, Material Science Forum 67-68 (1991) 257-262.

4) $Sb_2S_3$—AgX-$MX_2$, where X is Cl, Br, or I, M is Pb, Cd or Zn and $MX_2$<60%. Their refractive indices are within the range of about 1.8-2.6, and their wavelength range of transmission is 0.8-13 µm. See Gan Fuxi, Journal of Non-Crystalline Solids 140 (1992) 184-193; Samoilenko et al. Glass Physics and Chemistry 5 (2009) 656-660 Samoilenko et al., Glass Physics and Chemistry 4, (2003) 373-374.

5) $Sb_2Se_3$—$SbI_3$—$AgI_2$, where $AgI_2$>50%. Their refractive indices are within the range of about 2.0-2.8, and their wavelength range of transmission is 0.6-15 µm. See Gan Fuxi, Journal of Non-Crystalline Solids 140 (1992) 184-193.

6) $As_2S_3$—$GeS_2$—$Bi_2S_3$—$BiCl_3$—RCl, where R=Cs, K, Ag or Tl; $GeS_2+As_2S_3$>40%; $BiCl_3$=0-40% and RCl=10-25%. Their refractive indices are within the range of about 1.8-2.4, and their wavelength range of transmission is 0.4-12 µm. See Gan Fuxi, Journal of Non-Crystalline Solids 140 (1992) 184-193.

7) $GeSe_2$—$Bi_2Se_3$—$BiCl_3$—RCl, where R=Cs, K, Ag or Tl; $GeSe_2$>40%, $BiCl_3$=0-40% and RCl=10-25%. Their refractive indices are within the range of about 2.0-2.6, and their wavelength range of transmission is 0.6-14 µm.

8) RX-$Ga_2S_3$—$GeS_2$, where R=Cs, K, Ag or Tl; X=Cl, Br or I; RX=10-50%; and $Ga_2S_3$=10-50%. Their refractive indices are within the range of about 1.8-2.3, and their wavelength range of transmission is 0.5-12 µm. See Xiang Shen, et al. Journal of Non-Crystalline Solids 357 (2011) 2316-2319.

9) RX—$Ga_2Se_3$—$GeSe_2$, where R=Cs, K, Ag or Tl; X=Cl, Br or I; RX =10-50%; and $Ga_2Se_3$=10-50%. Their refractive indices are within the range of about 2.0-2.6, and their wavelength range of transmission is 0.6-14 µm. See Jing Ren, et al. JOURNAL OF APPLIED PHYSICS 109, 033105 (2011).

The amounts by % given for the glasses disclosed herein are by mol %.

In one preferred aspect, not mandatorily in all embodiments, excluded from the invention is the use of glasses as bonding glasses that are chalcogenide glasses, especially chalcogenide halogen-containing glasses. Such excluded glasses include especially the glasses disclosed in U.S. Pat. No. 3,157,521, which are formed by melting selenium and sulfur, and optionally arsenic, boron, phosphorus, or silicon. Such excluded glasses also include especially the glasses disclosed for use as bonding glasses in Bormashenko, Development of the technology of contacting ZnSe infrared optical windows using polyethylene films, Opt. Eng. 40(9) 1754-1755 (2001); and the therein cited V. Kokorina, Glasses for IR Optics, CRC Press, Boca Ratan, FL (1996); and Ye. I. Melnikova, V. V. Melnikov, L. V. Sergeev "Thermoplastic Gluing Fusion TKS1, Transparent in IR-Spectrum Range" OMP 3, 68, 1973. The glasses disclosed as bonding glasses in these references are incorporated herein by reference, and include charcogenide halogen-containing glasses, and more specifically the glasses identified therein as IRG35, TKS-1, BV-1 and BV-2. IGR35 is known to have the composition $Se_{57}I_{20}As_{18}Te_3Sb_2$, which should have a very low Tg and acceptable stability, but would have a very high index (2.8-3.2) and little transmission at shorter wavelengths unless very thin. Thus, said glass would lead to high light loss, which is pointed-out by the prior art, e.g., E. Bormashenko and R. Pogreb, Development of new nearinfrared filters based on the "sandwich" polymer-chalcogenide glass-polymer composites, Opt. Eng. 40(5) 661-662 (May 2001), S. R. Elliot, "Chalcogenide glasses," Chap. 7 in Materials Science and Technology, Glasses and Amorphous Materials, J. Zarzycki, Ed., pp. 375-454, VCH, Weinheim~1989. ; V. Kokorina, Glasses for Infrared Optics, CRC Press~1996; J. A. Savage, Infrared Optical Materials and Their Antireflecting Coatings, Adam Hilger, Bristol ~1987. The compositions of IRG35, TKS-1, BV-1 and BV-2 are incorporated herein by reference from the above citations. Also notes is that IRG35 is used in the prior art in conjunction with polymers due to its softening point, whereas the use thereof in an aspect on the invention herein as an optical adhesive for IR optical elements, takes advantage of a large difference in softening points of the materials bonded versus the optical adhesive, so as not to deform the surface curvatures of the optics during bonding.

Other glasses meeting the requirements/characteristics disclosed herein or similar glasses to the exemplified glasses disclosed herein are usable in the invention as bonding glasses.

All references disclosed for teaching glasses useful in the present invention are incorporated herein by reference, including their compositions disclosed broadly and more narrowly.

Coating options include, dipping one or both of the optical elements to be bonded into the bonding glass and bringing said elements into contact with each other. The bonding glass can be molten when the optical element(s) are dipped, or can thereafter be melted before, during or after the optical elements are brought into contact with each other. The unmelted bonding glass can be applied in a suspension with the glass being suspended as small particles in said suspension, the suspension typically containing a solvent and optionally a binder. The bonding glass can also be applied as a dry powder, e.g., by well-known powder coating methods.

Alternatively, the bonding glass, e.g., in a suspension, may be coated onto one or both of the optical elements to be bonded, e.g., by a spray or brush, and thereafter heated to melt the bonding glass. Optionally, a vacuum may be applied during the melting of the bonding glass to help remove any solvent or other materials and possible air bubbles from the bonding glass. A further option includes the injection of the bonding glass between the optical elements, e.g., in a molten state or unmelted as described above, which can be melted after injection to form the bonding layer.

Preferably, the bonding glass is prepared by melting and casting the glass. A frit or power of the bonding glass is prepared by various grinding processes such as ball milling, attrition milling, jet milling, etc. The particle size should be below 50 microns. Suitable commercially available bonding glasses may be in ground or unground form. Preferably, the coefficient of thermal expansion is tuned through the addition of powders of low-expansion materials such as fused silica power, if the index of such low-expansion materials are well-matched to the adhesive bonding glass composition. Particle sizes for additives should be nanometer-scale for oxide glasses, and 100 nm to 1 μm for chalcogenids. Possibilities include: Fused silica or high-quartz solid solution for use with bonding glasses that are based on $P_2O_5$ or $B_2O_3$. ZnS may be added to chalcogenide or halide bonding glasses with index between 2.0 and 2.5; ZnSe or GaP may be used with bonding glasses based on mid-to-high index chalcogenides; and GaAs may be used with bonding glasses based on Te—As—Ge—Se glasses.

Preferably, the glass powder formulation described above is applied to the surface of the glass elements to be bonded by one of several processes, which include: applying as a powder directly by metering into a die; applying as a powder using an electrostatic technique such as powder coating; and applying as a mixture with a solvent or solvent and binder to form a paint. The second optical element thereafter is placed and held mechanically with a given force against the first optic and powder layer.

The optical elements are then bonded together at elevated temperature. The assembly is heated to a temperature approximately 20% above the glass transition temperature of the bonding glass in Kelvin while applying pressure. The exact temperature will depend on the applied pressure. The selection of temperature and pressure can vary from one instance to another, depending on the thermal stability and mechanical strength of the materials to be bonded. For example, when bonding materials which are mechanically weak, lower pressure and higher temperatures may be used. Conversely, thermally unstable optical elements may be bonded with the use of higher pressures and lower temperatures.

The use of an oxygen atmosphere can assist in the degradation of the bonding material as is often used in sintering of oxide materials, but is not suitable for use with non-oxide bonding materials. The use of vacuum during bonding is particularly advantageous for removing gasses from the voids between powder grains and preventing the formation of entrapped bubbles. However, when bonding under vacuum, removal of binders and solvent may become difficult in the cases where the bonding agent is applied as a paint, and this would generally degrade IR performance.

Water may be used as a solvent or dispersant agent for oxides where IR transmission is not desired. However, water is useful in the process as it yields a good bond without any organic for the bonded materials especially when non-IR transmitting optical elements are bonded. Suitable solvents for IR materials (for example, for chalcogenides and halides) are those which are non-reactive, and have relatively high vapor pressures and low boiling points, such as dry alcohols and alkanes and low-molecular weight chlorinated solvents, e.g., dichloromethane. Non-polar solvents without hydrogen include perfluorohexane, tetrachloroethylene and carbon disulfide, which are very advantageous because they offer low solubility for water and low surface energy. However, care should be taken to exclude oxygen from perflourinated solvents, which have a high solubility for molecular oxygen. For instance, molecular oxygen can be removed by sparging with argon or nitrogen.

Binders which are suitable are those with a high vapor pressure such as menthol, camphor, or more preferably cyclo-octadecane, which is highly nonreactive and soluble in perflourinated solvents. However, binders are not always needed as good results have been obtained using only minimal quantities of solvent to disperse the frit particles.

Example: A glass containing 8 mol % Arsenic and 92 mol % Sulfur is prepared using the well-known melt-quench technique in a sealed, evacuated silica ampoule at 400° C. The resulting bulk glass is then powdered by ball milling under inert glass and is sieved to give a uniform particle size. Smaller particle sizes below 40 μm are preferred. This powder is dispersed in sufficient solvent to yield a paste; tetracholorethylene and perflouorohexane have been shown to give good results and leave no detectable organic absorption in the IR. Sufficient mixture is placed between two planar optical surfaces to give a continuous bond layer, ~0.1 mm has been shown to be sufficient for 25 mm diameter optics. The optics are then placed into a vacuum, which is evacuated to pressure less than 10 Torr. The oven is then heated to 200° C. at 5 degrees per minute while applying a pressure of 100 N and holding for a period of at least 20 minutes to ensure removal of bubbles. The bonded piece may then be removed and cooled immediately, or slowly cooled to room temperature before removing from the oven. The latter allows a bond with lower stress and prevents thermal fracture of the bonded optics. When applied to oxide glasses, the above procedure has been shown to give a bond of sufficient strength to prevent thermal shock or stress delamination. The refractive index of the bonding glass may be tuned be replacing S with Se up to 100%, giving an index range of 2.2 to 2.8, Ge, Ga, and Sb may be substituted for As.

The preceding examples can be repeated with similar success by substituting the generically or specifically described reactants and/or operating conditions of this invention for those used in the preceding examples.

Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever.

From the foregoing description, one skilled in the art can easily ascertain the essential characteristics of this invention and, without departing from the spirit and scope thereof, can make various changes and modifications of the invention to adapt it to various usages and conditions.

The invention claimed is:

1. An infrared optical combination of two optical elements having infrared transmission bonded together by a bonding glass that has infrared transmission, wherein the bonding glass comprises As and S, wherein S>70 mol % and 0 mol %<As<30 mol %, and wherein the bonding glass does not contain Se.

2. An infrared optical combination of two optical elements according to claim 1, wherein the bonding glass has a Tg<150° C. and expansion below 50 ppm/K, wherein Tg is the glass transition temperature of the bonding glass.

3. An infrared optical combination of two optical elements according to claim 1, wherein one or both of the two optical elements contains thereon an adhesion promoter layer on a surface bonded together by the bonding glass.

4. A process for preparing an infrared optical combination of two optical elements according to claim 1, comprising applying the bonding glass to a surface of at least one of the two optical elements, contacting the two optical elements together such that the bonding glass is present between said optical elements, and heating to melt the bonding glass to form the optical combination.

5. An optical device or instrument, comprising an infrared optical combination according to claim 1.

6. An infrared optical combination of two optical elements according to claim 1, wherein the bonding glass has a refractive index of 2.0 to 2.8.

7. An infrared optical combination of two optical elements according to claim 1, wherein the bonding glass transmits light having a wavelength of 0.5 to 14 μm.

8. An infrared optical combination of two optical elements according to claim 5, wherein the bonding glass has 8 mol % As and 92 mol % S.

9. An infrared optical combination of two optical elements according to claim 1, wherein the bonding glass contains 8 mol % to less than 30 mol % As.

10. An infrared optical combination of two optical elements according to claim 1, wherein the bonding glass consists essentially of As and S, wherein S>70 mol % and 0 mol %<As<30 mol %.

11. An infrared optical combination of two optical elements having infrared transmission bonded together by a bonding glass that has infrared transmission, wherein the bonding glass comprises As and Se, wherein Se>70 mol % and 0 mol %<As<30 mol %, wherein the bonding glass does not contain S.

12. An infrared optical combination of two optical elements according to claim 11, wherein the bonding glass has 8 mol % As and 92 mol % Se.

13. An infrared optical combination of two optical elements according to claim 11, wherein the bonding glass has a Tg<150° C. and expansion below 50 ppm/K, wherein Tg is the glass transition temperature of the bonding glass.

14. An infrared optical combination of two optical elements according to claim 11, wherein one or both of the two optical elements contains thereon an adhesion promoter layer on a surface bonded together by the bonding glass.

15. A process for preparing an infrared optical combination of two optical elements according to claim 11, comprising applying the bonding glass to a surface of at least one of the two optical elements, contacting the two optical elements together such that the bonding glass is present between said optical elements, and heating to melt the bonding glass to form the optical combination.

16. An optical device or instrument, comprising an infrared optical combination according to claim 11.

17. An infrared optical combination of two optical elements according to claim 11, wherein the bonding glass has a refractive index of 2.0 to 2.8.

18. An infrared optical combination of two optical elements according to claim 11, wherein the bonding glass contains 8 mol % to less than 30 mol % As.

19. An infrared optical combination of two optical elements according to claim 11, wherein the bonding glass consists essentially of As and Se, wherein Se>70 mol % and 0 mol %<As<30 mol %.

20. An infrared optical combination of two optical elements having infrared transmission bonded together by a bonding glass that has infrared transmission, wherein the bonding glass consists of As and S, wherein S>70 mol % and 0 mol %<As<30 mol %, or As and Se, wherein Se>70mol % and 0 mol %<As<30 mol %.

21. A process for preparing an infrared optical combination of two optical elements according to claim 20, comprising applying the bonding glass to a surface of at least one of the two optical elements, contacting the two optical elements together such that the bonding glass is present between said optical elements, and heating to melt the bonding glass to form the optical combination.

22. An infrared optical combination of two optical elements according to claim 20, wherein one or both of the two optical elements contains thereon an adhesion promoter layer on a surface bonded together by the bonding glass.

23. An optical device or instrument, comprising an infrared optical combination according to claim 20.

* * * * *